United States Patent [19]

Sidman

[11] 4,172,267
[45] Oct. 23, 1979

[54] DYNAMIC FILTER FOR A MOVING HEAD DISK STORAGE SYSTEM

[75] Inventor: Michael D. Sidman, Malden, Mass.

[73] Assignee: Digital Equipment Corporation, Maynard, Mass.

[21] Appl. No.: 892,601

[22] Filed: Apr. 3, 1978

[51] Int. Cl.² .................. G11B 21/08; G11B 21/10; G11B 5/56

[52] U.S. Cl. ........................... 360/78; 360/77; 360/98

[58] Field of Search .................. 360/77–78, 360/27, 68, 98–99, 69; 346/137

[56] References Cited

U.S. PATENT DOCUMENTS

| | | | |
|---|---|---|---|
| 3,427,606 | 2/1969 | Black et al. | 360/78 |
| 3,864,741 | 2/1975 | Schwarz | 360/77 |
| 3,947,881 | 3/1976 | Dahill et al. | 360/77 |
| 3,994,016 | 11/1976 | Moghadam | 360/78 |
| 4,075,667 | 2/1978 | Rose et al. | 360/77 |
| 4,085,427 | 4/1978 | Dunn | 360/78 |

*Primary Examiner*—Alfred H. Eddleman
*Attorney, Agent, or Firm*—Paul E. Kudirka; Thomas C. Siekman

[57] ABSTRACT

A dynamic filter circuit used to process analog position error information in a disk drive head-positioning servo system is disclosed. The filter circuit monitors the velocity of the disk drive carriage and dynamically increases the gain and bandwidth of the filter as the carriage velocity increases. Specifically, an operational amplifier in feedback configuration is used in which the feedback networks are switched in response to the velocity signal. At low carriage velocity the filter has low gain and reduced bandwidth and therefore helps to decrease sensitivity of the system to noise. At high carriage velocities the gain and bandwidth of the filter are increased to minimize the effects of missing servo data.

13 Claims, 6 Drawing Figures

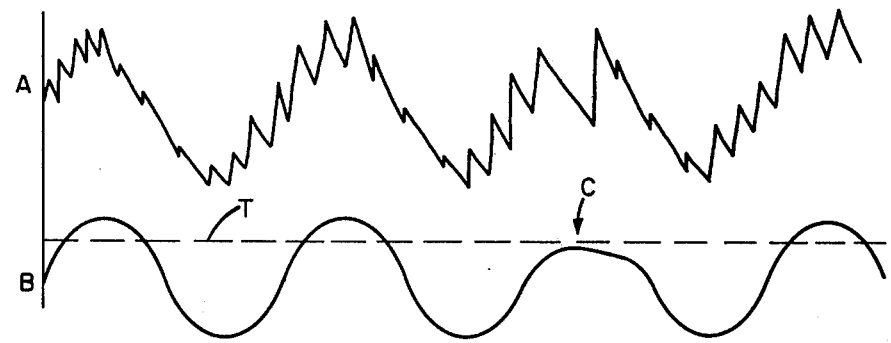
Fig. 2a.
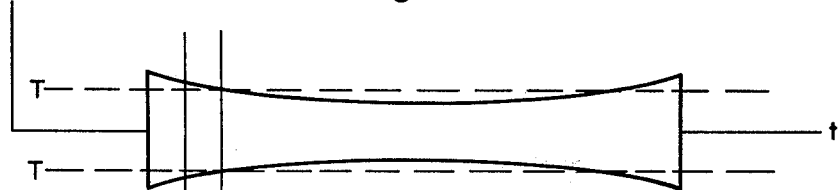
Fig. 2b.
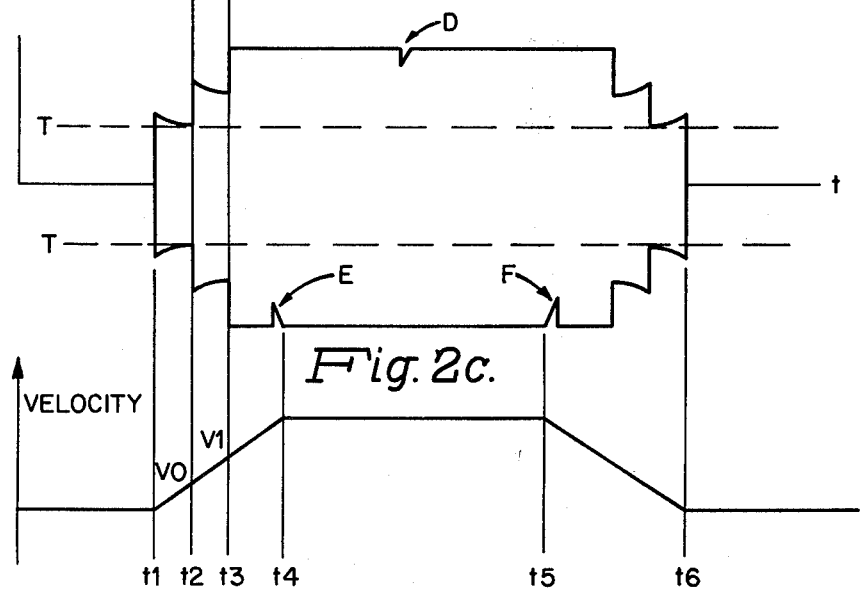
Fig. 2c.
Fig. 2d.

DYNAMIC FILTER FOR A MOVING HEAD DISK STORAGE SYSTEM

BACKGROUND OF THE INVENTION

1. Field of the Invention

This invention relates to magnetic disk drive storage systems having moveable magnetic transducers and more particularly to filter circuits that process the position error signal developed by the electronic servo circuitry which positions the magnetic transducers.

2. Description of the Prior Art

Many magnetic data recording systems utilize a recording disk with a coating of magnetic material that is selectively magnetized to record digital information. In order to record information at a high density, the magnetic disk is normally rotated at high speeds by an electric motor and has a large number of closely spaced "tracks" on which information is recorded on its surfaces. In this type of magnetic disk recording system, or magnetic disk memory, magnetic transducers of "heads" are provided to read information from or to write information on the magnetic disk surfaces.

In many systems a head is provided for each data track on the disk surface. In other systems, a single head or sets of heads are used to read and write all data tracks. These heads are moved over the disk surface by means of a drive carriage which is in turn controlled by a servomechanism. The servomechanism moves the drive carriage and by using servo signals, which are recorded on one surface of the magnetic disk, positions each head over a single data track to process the information located in that track.

There are several methods for recording the servo information on the disk surfaces. In one common implementation one disk surface called a "servo surface" is entirely dedicated to servo information. In this type of system a dedicated head called a "servo head" is used to read the servo information from the servo surface. The servo head is linked mechanically to other heads which read or write data information on other data tracks. During manufacture of the disk drive, the data heads are aligned relative to the servo head. During subsequent operation the servo circuitry moves the entire head unit, including the servo and data heads, until the servo head is in the proper location with relation to the servo data. Since the servo and data heads are in alignment, the data heads are thereby properly positioned.

The servo data which is recorded on the servo surface is typically a number of repetitive pulses which occur at a fixed frequency as the disk moves past the servo head. The servo information is arranged to change as the servo head is moved across tracks. Thus, the information can also be used to count the number of tracks over which the servo head was moved; allowing the attached data heads to be moved from one data track to another data track under control of the servomechanism. When the servo data is recorded at the proper frequency, track counting is reliable and the system operates properly.

In some cases, however, it is necessary to increase the number of data tracks per disk surface in order to increase the storage capacity of the disk. The number of servo tracks will also increase as there is generally a one-to-one correspondence between the number of servo and data tracks. Often when the track "density" is increased, it is not possible to increase the servo data frequency proportionally to the increase in track density without a major modification of the servo writing equipment and without redesigning the servo channel circuitry in the disk drive. In addition, increasing the servo density also increases the probability of significant effects resulting from noise pickup from an adjacent data head in the process of writing. These effects occur because as the servo data frequency increases it becomes closer to the frequency of the data being written and data frequency pickup cannot be filtered out from the servo information. Therefore, in many cases the servo frequency must remain the same when the track density is increased.

When the track density is increased and the servo frequency remains the same, the reliability of the track counting circuitry is decreased due to several factors. One factor is a decrease in the signal to noise ratio of the position error signal which is used by the servo system to properly locate the heads. This occurs because noise in the servo circuitry generally remains constant as the track density is increased. However, a narrower servo head must be used in conjunction with the higher track density and therefore, the head output amplitude is decreased and the signal to noise ratio decreases proportionally. In addition, since the narrower head "sees" a smaller portion of the disk surface, defects in the magnetic coating of the disk contribute more noise to the signal.

A poor signal-to-noise ratio has serious effects, particularly at low carriage velocities due to the fact that the position error signal is fed into comparators which determine a threshold voltage used in track counting. If a sufficiently noisy signal is applied to the track counting comparators, the hysteresis of the comparator may be exceeded by the noise voltage and multiple track crossings may be indicated even though in fact only one track has been crossed. Since the velocity at which the head carriage moves is normally determined by the number of remaining tracks to go to the destination, at low velocities an error in track count can cause a significant increase in positioning time.

Another problem which results from increased track density is error caused by missing servo information. Servo information may not be recorded properly on the disk surface, and in addition in some systems the absence of servo information is used to index a particular section of the disk. At high track densities and high carriage velocities, only a few pulses of servo information may be "seen" by the servo head as the head crosses each track. If some of these pulses are missing, the position error signal developed from the servo pulses may not exceed the threshold necessary for track counting and an improper track count will result.

One method which has been used to attempt to solve the noise problem is to pass the servo information through a low pass filter. This has the advantage of removing noise which causes track counting errors at low carriage velocities. However, as the carriage velocity increases, and greater numbers of tracks are crossed per unit of time, the frequency of the position error signal derived from the servo information also increases, and therefore the output of the low pass filter also decreases. Once the signal amplitude falls below the threshold of the comparator used for track counting, no track counting occurs and the head positioning carriage will overshoot its destination.

SUMMARY OF THE INVENTION

The foregoing and other problems are solved by one illustrative embodiment of the invention in which a filter having variable gain and bandwidth is used to remove noise from the servo position error signal. The gain and bandwidth of the filter are set so that at low velocities of the head positioning carriage, noise is greatly attenuated and an acceptable signal to noise ratio is obtained to prevent erroneous track counts. However, as the carriage velocity increases the gain and bandwidth of the filter are also increased. Therefore, as the position error signal frequency increases the bandwidth of the filter increases and signal amplitude is not reduced. In addition, the gain of the circuit is increased to prevent truncations of the position error signal (which occur due to missing servo samples) from falling below the threshold level used to indicate a track crossing. Erroneous track counting due to missing servo samples is thereby avoided.

Specifically, the filter circuitry monitors the velocity signal derived from a servo tachometer which is generally used in servo systems of this type. This signal is first passed through an absolute value circuit and then applied to several threshold detectors. These detectors respond to fixed values of the velocity. Each threshold detector controls a portion of a feedback network of an operational amplifier. As the velocity increases, each threshold detector responds by changing the feedback configuration of the operational amplifier. The position error signal to be filtered is fed into the operational amplifier circuit and as the gain and bandwidth of the operational amplifier circuitry changes, the position error signal is appropriately processed by the operational amplifier.

BRIEF DESCRIPTION OF THE DRAWING

FIGS. 2a-2d of the drawing show several typical waveforms which result from the operation of the servo circuitry.

DETAILED DESCRIPTION

Figure 1:
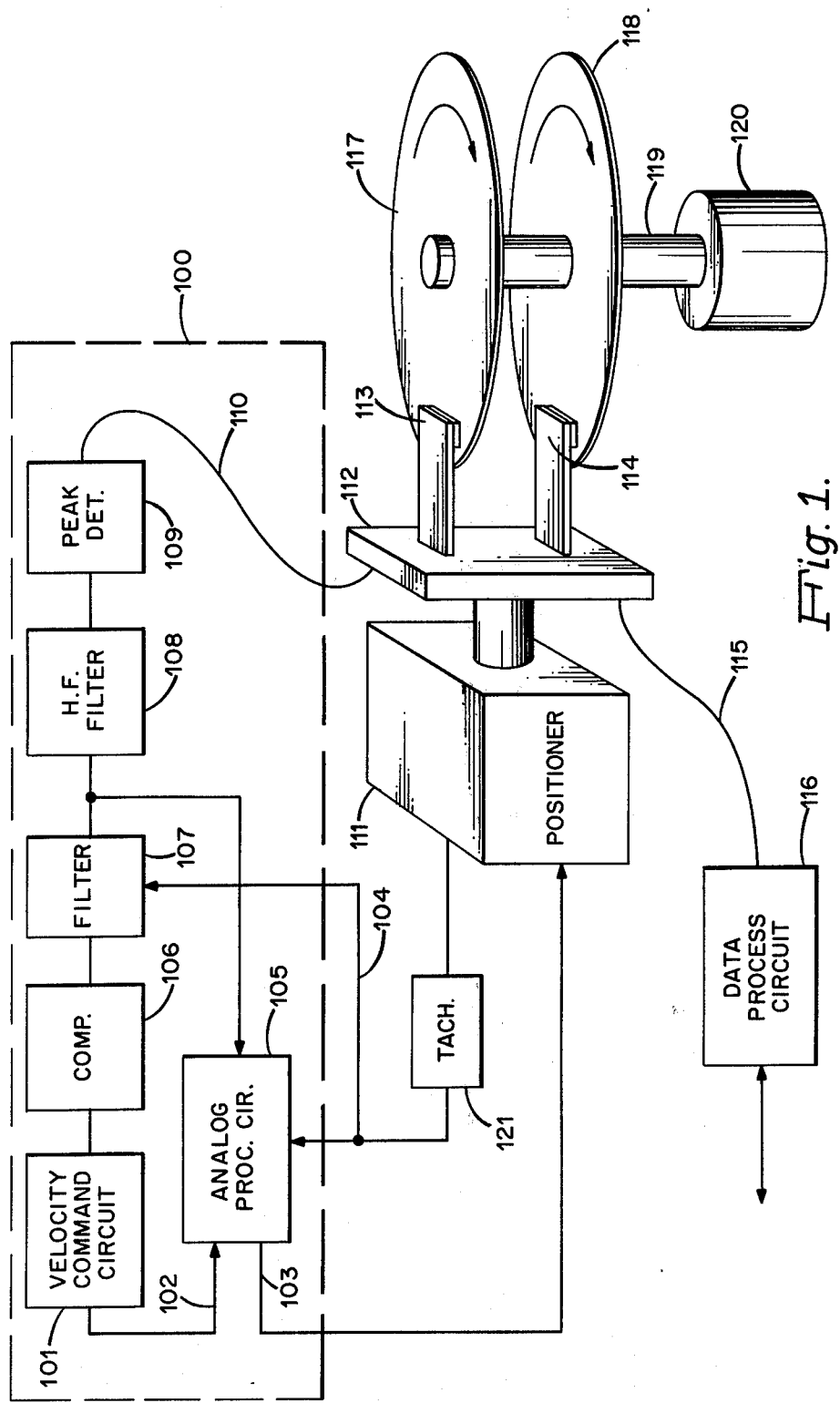
FIG. 1 of the drawing shows a block diagram of a typical moving-head disk storage system.

FIG. 1 shows the component parts of a typical moving head disk storage system. Most of the circuitry and apparatus shown in FIG. 1 is well known in the art and will only be described herein to the extent necessary to understand the invention. The inventive filter circuitry is illustratively contained in the heavy black lined box 107. Magnetic disks 117 and 118 are rotated at high speeds by motor 120 via shaft 119. Digital information is read off or written onto the surfaces of disks 117 and 118 by means of magnetic transducers or "heads" 113 and 114 respectively. Since only one head is provided for an entire disk surface, heads 113 and 114 must be moved in order to cover the entire surface of disks 117 and 118. Accordingly, heads 113 and 114 are connected to carriage 112, which is in turn moved by positioner apparatus 111. Such apparatus is well known to those skilled in the art and will not be described further herein.

Typically, in a moving head disk storage system, servo information which controls the operation of positioner 111 is stored on a dedicated disk surface. For example, servo information may be stored on the upper surface of disk 117. Head 113 is thus a dedicated servo head which reads servo information that has been prerecorded on the upper surface of disk 117. Servo information read by head 113 is passed over leads 110 to the servo processing circuitry 100. Head 114 may be used to read or write digital data on the upper surface of disk 118. Since head 114 is coupled mechanically to head 113 via carriage 112, positioner mechanism 111 will properly locate head 114 over a data track by means of signals developed by servo processing circuitry 100. Data information read off of disk 118 or data information to be written onto disk 118, is communicated to head 114 via lead 115 from the data processing circuitry 116. Such circuitry is also well-known to those skilled in the art and will not be described further herein.

Servo information for a disk positioning servo arrangement can be recorded on the dedicated servo surface in many different ways. In one method of recording servo information, the magnitude of the position error signal used to position heads 113 and 114, which signal is derived from servo information recorded on disk 117 is at a null when the associated data heads are located directly over data tracks. As the data heads move off of the data track centerline, the magnitude of the position error signal increases either positively or negatively to a maximum between tracks.

Typically, the recorded servo information consists of a number of repetitive pulses. Peak detectors, such as peak detector 109, are used in the servo circuitry to detect when one of these pulses has moved underneath the servo head. Peak detector 109 is arranged to produce a high signal output when a servo pulse passes under servo head 113 and then the peak detector output decays until the next servo pulse reaches the head.

Assuming head positioner carriage 112 is located so that the data heads are over data tracks, a steady stream of servo pulses passes under servo head 113, and the output of peak detector 109 assumes an oscillating waveform having peaks corresponding to each servo pulse and decreasing signal between peaks. As head positioner carriage 112 is moved from track to track, however, the magnitude of the repetitive pulses received by servo head 113 changes as the carriage position moves away from the data track centerline. The position error signal, which is derived from these repetitive pulses, reaches a either a positive or negative maximum when the carriage is positioned between data tracks. When the carriage moves at constant speed across a number of servo tracks, the output of peak detector circuit 109 assumes the signal shape shown in line A of FIG. 2a. The frequency of this near-sinusoidal signal depends on the speed at which the servo tracks are crossed.

Typically, a position error signal is processed to remove the high frequency peak detector ripple by a high frequency filter, such as filter 108, and a signal as illustrated in line B of FIG. 2a results. Of particular interest is point C in FIG. 2a. At point C a servo sample or several servo samples have been improperly written or are missing from the head servo information. In this case, the peak detector output decays to a low value before subsequent servo signals are detected. Therefore, the magnitude of the position error signal becomes truncated after filtering.

In prior art circuits, this signal is usually fed directly into a comparator, such as comparator 106, to determine when a track has been crossed. A typical comparator threshold level is shown as level T in line B of FIG.

2a. When the head position error signal exceeds level T, a track crossing is registered by velocity command circuit 101. Velocity command circuit 101 develops a velocity command which is applied to analog processing circuit 105, via lead 102, to indicate the proper speed at which carriage 112 should be moved. Analog processing circuit 105 also receives velocity information indicating the actual velocity of carriage 112 from tachometer circuit 121 via lead 104 (tachometer circuits such as circuit 121 are well known in the art and will not be described further herein). Circuit 105 utilize this information to control positioner apparatus 111 which in turn controls the position and velocity of carriage 112. After carriage 112 has reached the proper track position, circuit 105 receives the position error signal from high-frequency filter 108 and utilizes this signal to keep carriage 112 in the proper position.

In severe cases, truncations in the position error signal prevent the signal from reaching the proper threshold level required to trigger a track count (such as at point C in FIG. 2a). An error in track counting then results causing velocity command circuit 101 to produce incorrect velocity commands, in turn causing the incorrect control of positioner circuit 111. Errors of this type are more likely to occur at high carriage velocities where small numbers of samples are encountered as each track is crossed.

On the other hand, noise signals (which are not shown in FIG. 2a) may cause an error in track counting by changing the position error signal so that comparator 106 responds when it normally would not have responded. This effect is particularly severe with low frequency noises.

Advantageously, according to the invention, low pass filtering is provided by filter circuit 107 to remove low frequency noise components which cause erroneous track countings. To prevent attenuation of the track error position signal as the carriage velocity increases, the bandwidth of the low pass filter is increased with increasing carriage velocity. In addition, gain is added to the circuitry to compensate for signal truncation resulting from missing samples. The filtered output of filter circuit 107 is provided to comparator circuits 106 which determine the track counting threshold.

FIGS. 2b and 2c show an envelope of the peaks of a servo signal such as that shown in FIG. 2a, line B. These servo signals result from a movement of the head positioning carriage in which the carriage velocity starts from zero at time t1, increases to a maximum at time t4, continues at maximum from time t4 to time t5 and decreases from maximum to zero at time t6 as shown in FIG. 2d.

FIG. 2b shows the envelope of the position error signal which results if the signal is passed through a simple low-pass filter as in the prior art. As the frequency of the position error signal increases with increasing velocity, the amplitude of the signal decreases until at time t3 and velocity V1 the magnitude of the position error signal decreases below threshold level T and no track counting occurs. Obviously, such a filtering arrangement will not produce satisfactory operation.

However, advantageously according to the principles of the present invention, the gain and bandwidth of filtering circuitry 107 are not constant but increase as the velocity increases. The envelope of the resulting position signal is shown in FIG. 2c. For carriage velocities from zero to V0 a low-pass filter arrangement similar to that used to generate the position error signal shown in FIG. 2b is utilized. The high attenuation of the low-pass filtering effectively filters noise out of the signal at low carriage velocities. As the carriage velocity increases, however, the signal level drops. Before the signal level has fallen below the threshold T as shown in 2c, however, (at velocity V0) the gain and bandwidth of the filter are increased resulting in an increase of the magnitude of the signal level. Similarly, at velocity V1 the gain and bandwidth of the filter circuitry are again increased. The gain of the circuitry is increased to a point where truncations such as at points D, E, and F in FIG. 2c do not fall below threshold level T, resulting in incorrect track counts. Similarly, as the carriage velocity decreases between times t5 and t6, the gain and bandwidth of the filter circuitry decrease to their original states.

Figure 3:
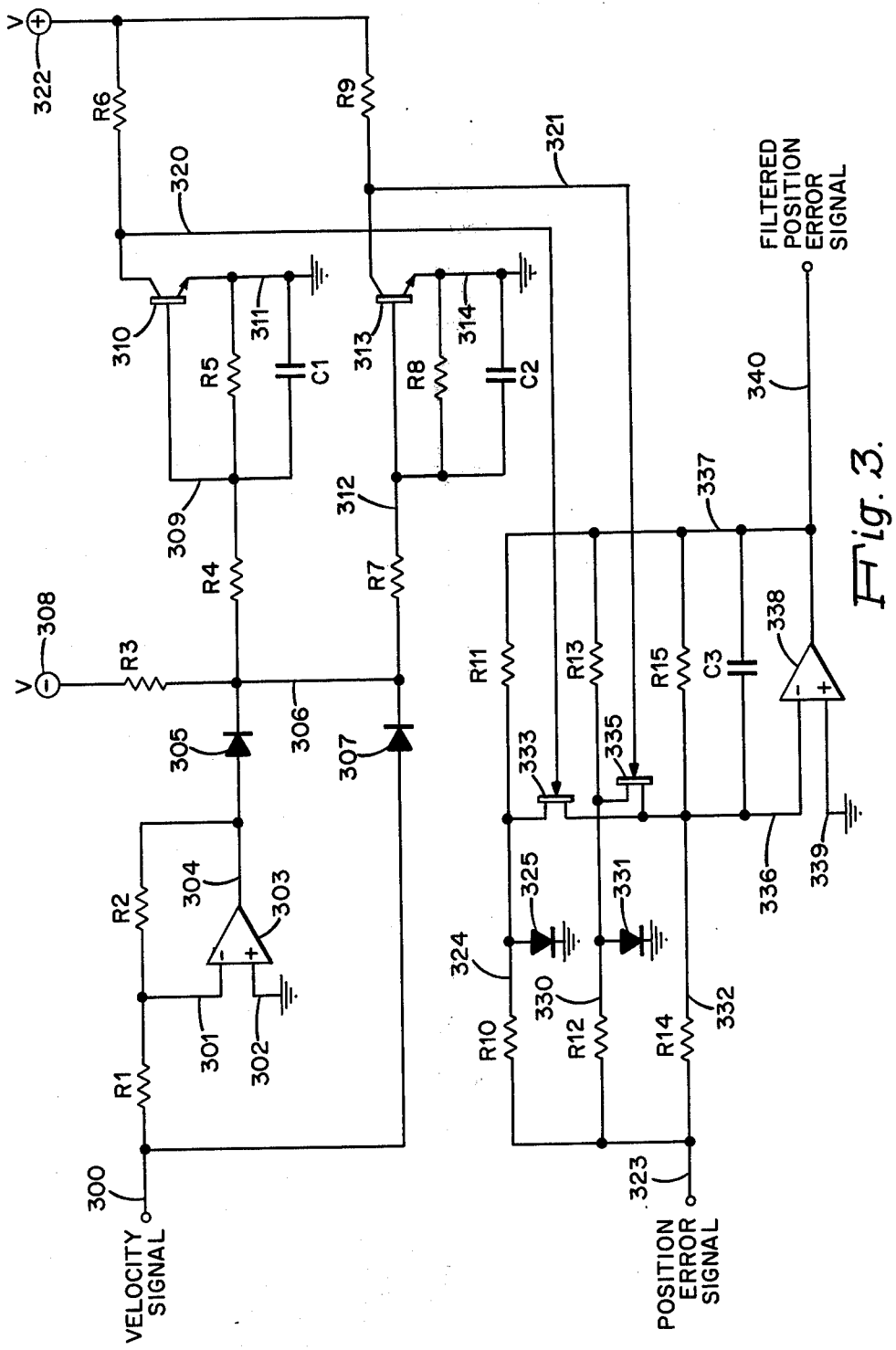
FIG. 3 of the drawing shows an illustrative electrical schematic of the inventive filter circuitry.

An illustrative circuit which has the gain and bandwidth characteristics shown in FIG. 2c is shown in FIG. 3. In FIG. 3 the unfiltered position error signal enters the circuitry at the left hand side via lead 323. The signal is filtered by the filter circuitry consisting of amplifier 338, resistors R10 through R15, and capacitor C3, and the filtered signal leaves the circuitry via lead 340.

As will be hereinafter explained, the gain and bandwidth of the filter circuitry are changed via FET transistors 333 and 335. Transistors 333 and 335 are controlled by threshold detectors consisting of transistors 310 and 313 and related circuitry. These are in turn controlled by an absolute value circuit which responds to a velocity signal present at lead 300 developed from the servo tachometer 121 and forwarded to filter circuit 107 (FIG. 1) via lead 104.

Specifically, the velocity signal present on lead 300 is forwarded to the absolute value circuitry consisting of amplifier 303, resistors R1 and R2 and diodes 305 and 307. The output of the absolute value circuit is lead 306 which is normally held in a low state by means of resistor R3 and voltage source 308. If a positive signal is present on lead 300, however, diode 307 passes into its conducting state and lead 306 then follows the positive signal on lead 300 reduced by the diode drop of diode 307. A negative signal on lead 300, however, is applied via resistor R1 and lead 301 to the negative input of amplifier 303. Amplifier 303 is connected in a standard and negative feedback arrangement with its positive input grounded via lead 302. Therefore, if the values of resistors R1 and R2 are equal, amplifier 303 operates as a simple inverting amplifier with a gain of minus one. Therefore, a negative signal at lead 300 produces a positive signal on amplifier output 304 which pulls lead 306 positive via diode 305. Therefore, a negative or positive signal on lead 300 produces a positive signal on lead 306 which is proportional to the magnitude of the signal on lead 300 but reduced by the diode drop of either diode 305 or diode 307. Therefore, the absolute value of the velocity signal appears on lead 306.

The absolute value of the velocity signals on lead 306 is applied to threshold detectors consisting of transistors 310 and 313 via resistors R4 and R7 respectively. Transistor 310 is arranged with its emitter grounded through lead 311 and its base connected to the resistive divider formed by resistors R4 and R5. Capacitor C1 is provided to filter out voltage spikes originating from the velocity signal which might erroneously cause transistor 310 to turn on. As the signal on lead 306 increases to a predetermined level, the signal at the base 309 of transistor 310 increases until transistor 310 switches on. Upon turning on, transistor 310 grounds its output 320, which is normally held high via resistor R6 and voltage source 322.

Similarly, when the velocity signal present on lead 306 reaches pre-determined voltage determined by resistors R7 and R8, transistor 313 turns on grounding its output lead 321. The low signals appearing on leads 320 and 321 control FET transistors 333 and 335 to change the feedback arrangement of amplifier 338 as will be hereinafter described.

Assuming for the moment that transistors 333 and 335 are in their off or non-conducting state, amplifier 338 is connected in a simple negative feedback arrangement. In particular, the positive input of amplifier 338 is grounded via lead 339 and the negative input of amplifier 338 is connected via lead 336 to capacitor C3 and resistors R14 and R15. Resistor R15 and capacitor C3 are also connected via lead 337 to the output of 340 of amplifier 338. In this configuration, simple circuitry analysis shows that the D.C. gain of amplifier 338 is R15/R14. The bandwidth is 1/(2 (R15) (C3)).

As the value of the velocity signal present at lead 300 increases to a slightly higher level (the switching point of transistor 310), however, resistors R4, R5, R7 and R8 are chosen such that transistor 313 turns on but transistor 310 does not turn on. In this case, a low signal on lead 321 turns on FET transistor 335 to place it in its conducting state. Simple circuit analysis now shows that the D.C. gain of amplifier 338 is equivalent to (R15//R13)/(R14//R12), and the bandwidth of amplifier 338, is equal to 1/(2 (R15//R13) (C3)).

If the velocity signal at lead 300 further increases, transistor 310 will become conductive, grounding lead 320 and turning on FET transistor 333. In this case, the D.C. gain of amplifier 338 is equal to (R15//R13//R11)/(R14//R12//R10) and the bandwidth becomes 1/(2 (R15//R13//R11) (C3)). Proper selection of resistor and capacitor values will give the gain and bandwidth characteristics that give the performance shown in FIG. 2b. Illustratively, the following values of resistors and capacitors may be used: R1=10 Kohms, R2=10 Kohms, R3=10 Kohms, R4=3.3 Kohms, R5=10 Kohms, R6=10 Kohms, R7=22 Kohms, R8=10 Kohms, R9=10 Kohms, R10=4 Kohms, R11=5.62 Kohms, R12=82.5 Kohms, R13=100 Kohms, R14=100 Kohms, R15=100 Kohms, C1=0.1 microfarads, C2=0.22 microfarads, and C3=470 picofarads. However, other values of resistors and capacitors may be used to vary the gain in bandwidth change threshold points all in accordance with their principles of the present invention.

What is claimed is:

1. A filter circuit for processing servo information in a disk storage system having a magnetic disk, a moveable magnetic transducer for reading and writing information on said disk, means connected to said transducer for generating servo information, and means for generating a velocity signal proportional to the velocity of said moving transducer, said filter circuit comprising
    means, responsive to said velocity signal for generating an output equal to the absolute value of said velocity signal,
    a plurality of detectors, each of said detectors being responsive to a pre-determined value of said output for producing a gate signal,
    an amplifier having an input for receiving said servo information and an output for producing processed servo information,
    a feedback network for controlling the gain and bandwidth of said amplifier, and
    means responsive to said gate signals for changing said feedback network of said amplifier to change said gain and said bandwidth.

2. A filter circuit, according to claim 1, wherein said generating means comprises
    means for receiving said velocity signal,
    inverting means connected to said receiving means and responsive to said velocity signal for producing an inverted velocity signal,
    a pair of diodes, one of said diodes having its anode connected to said receiving means to receive said velocity signal, the other of said diodes having its anode connected to said inverting means to receive said inverted velocity signal, and
    means for connecting the cathodes of each of said diodes together to generate the absolute value of said velocity signal.

3. A filter circuit, according to claim 2, wherein said amplifier consists of an operational amplifier having positive and negative inputs and an output, said positive input being connected to signal ground, and said negative input being connected to said receiving means to receive said servo information, and wherein said feedback network comprises a first plurality of resistors connectable to said amplifier negative input, each having one lead connected to said receiving means and another lead connectable to said amplifier negative input, and a second plurality resistors each having one lead connected to said amplifier output and another lead connectable to said amplifier negative input.

4. A filter circuit, according to claim 3, wherein said means for changing said feedback network of said amplifier comprises a plurality switch means, each of said switch mean being responsive to a gate signal produced by one of said plurality of threshold detectors for connecting one of said first plurality of resistors and one of said second plurality of resistors to said negative input of said amplifier.

5. A filter circuit, according to claim 4, wherein each of said threshold detectors comprises
    a transistor having a base, an emitter and a collector, said emitter being connected to signal ground,
    a voltage source,
    a resistive voltage divider consisting of two resistors connected in series to a junction point, one of said resistors being connected to signal ground, the other of said resistors being connected to said absolute value means,
    means for connecting said base of said transistor to said junction point of said two resistors, and
    means for connecting said transistor collector to said voltage source.

6. In a magnetic disk storage system having a magnetic disk, a moveable head for storing and retrieving digital information from said disk, means connected to said head for generating servo information indicating the position of said head, means responsive to said servo information for moving said head at various velocities and means connected to said head for generating a velocity signal proportional to the velocity of said head, a filter circuit for processing said servo information, said filter circuit comprising means responsive to said velocity signal for generating a plurality of output signals, each of said plurality of output signals corresponding to a discrete level of said velocity signal, circuit means having a selectable gain and bandwidth and being responsive to said servo information for processing said servo information to remove noise therefrom and, means responsive to each of said plurality of output signals for changing said gain and said bandwidth of said circuit means.

7. In a magnetic disk storage system, a filter circuit according to claim 6 wherein said generating means comprises means responsive to said velocity signal for developing an absolute value signal equal to the absolute value of said velocity signal, and a plurality of detector means, each of said plurality of detector means being responsive to a predetermined value of said absolute value signal for generating one of said plurality of output signals.

8. In a magnetic disk storage system, a filter circuit according to claim 7 wherein said circuit means comprises an amplifier having an input for receiving said servo information and an output for generating processed servo information, and a plurality of feedback means, each of said plurality of feedback means being selectively connectable to said amplifier input and said amplifier output.

9. In a magnetic disk storage system, a filter circuit according to claim 8 wherein said changing means comprises a plurality of switch means, each of said plurality of switch means being responsive to one of said plurality of output signals for connecting one of said plurality of feedback means to said amplifier input and said amplifier output, whereby the gain and bandwidth of said amplifier are determined by said one of said plurality of feedback means connected to said amplifier input and said amplifier output.

10. A magnetic disk storage system comprising
a magnetic disk,
means for rotating said disk,
a moveable magnetic transducer for storing and retrieving digital information from said disk,
means connected to said transducer for generating servo information indicating the position of said transducer,
means connected to said transducer for generating a velocity signal proportional to the velocity of said transducer,
a filter circuit responsive to said servo information for producing processed servo information, said filter circuit comprising
means responsive to said velocity signal for generating a plurality of output signals, each of said plurality of output signals corresponding to a discrete level of said velocity signal,
circuit means having a selectable gain and bandwidth and being responsive to said servo information for processing said servo information to remove noise therefrom and,
means responsive to each of said plurality of output signals for changing said gain and said bandwidth of said circuit means, and said magnetic disk storage system further comprising
means responsive to said processed servo information and to said velocity signal for moving said transducer at various velocities.

11. A magnetic disk storage system according to claim 10 wherein said generating means in said filter circuit comprises
means responsive to said velocity signal for developing an absolute value signal equal to the absolute value of said velocity signal, and
a plurality of detector means, each of said plurality of detector means being responsive to a predetermined value of said absolute value signal for generating one of said plurality of output signals.

12. A magnetic disk storage system according to claim 11 wherein said circuit means in said filter circuit comprises
an amplifier having an input for receiving said servo information and an output for generating said processed servo information, and
a plurality of feedback means, each of said plurality of feedback means being selectively connectable to said amplifier input and said amplifier output.

13. A magnetic disk storage system according to claim 12 wherein said changing means in said filter circuit comprises a plurality of switch means, each of said plurality of switch means being responsive to one of said plurality of output signals for connecting one of said plurality of feedback means to said amplifier input and said amplifier output, whereby the gain and bandwidth of said amplifier are determined by said one of said plurality of feedback means connected to said amplifier input and said amplifier output.

* * * * *